S. C. BEARDSLEY.
COW TAIL HOLDER.
APPLICATION FILED DEC. 20, 1910.
1,026,378.
Patented May 14, 1912.
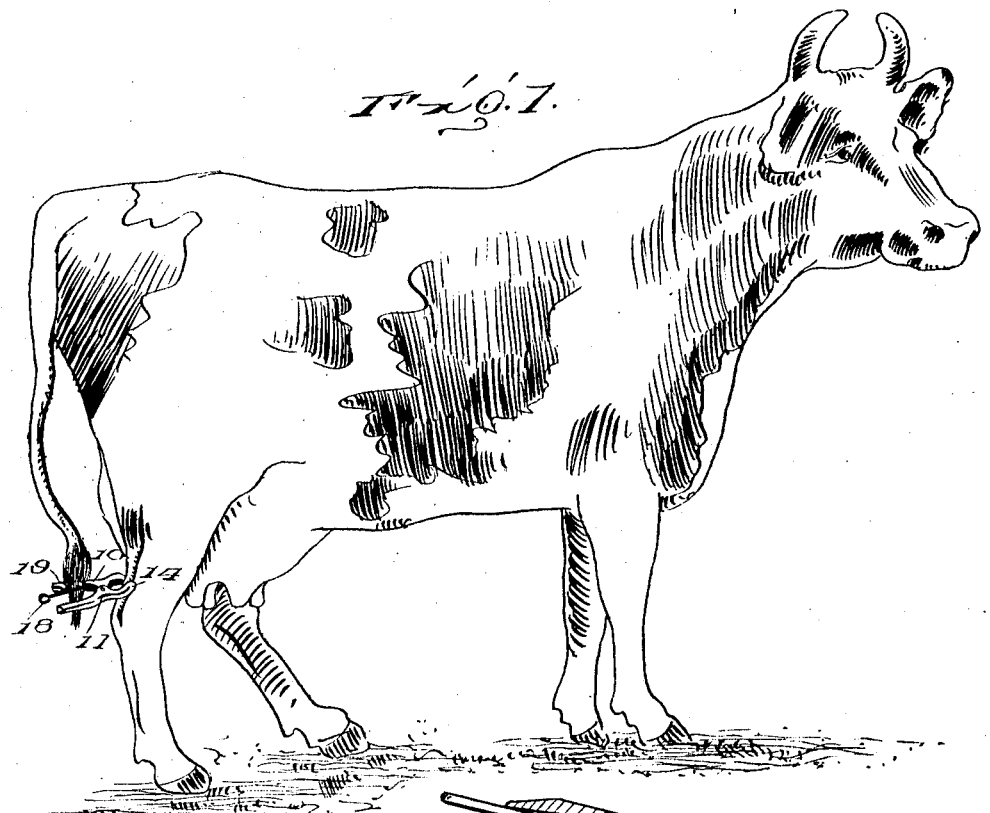
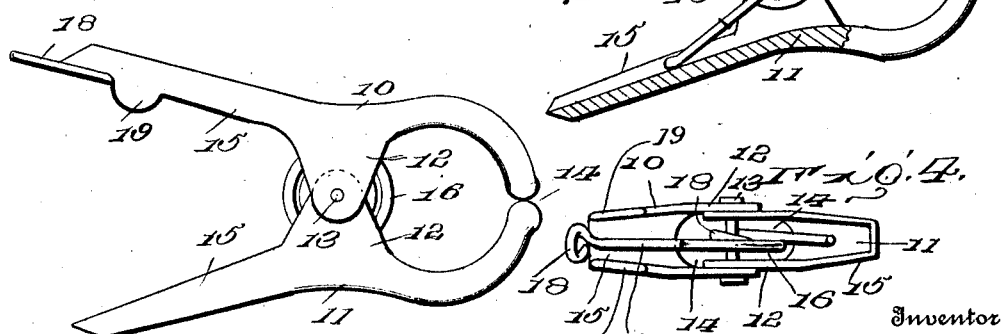
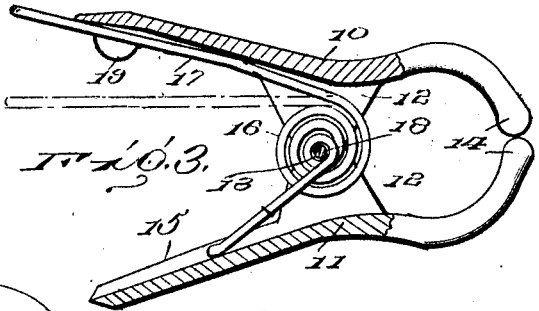
Inventor
S. C. Beardsley

UNITED STATES PATENT OFFICE.

SYLVESTER C. BEARDSLEY, OF KIRKSVILLE, MISSOURI.

COW-TAIL HOLDER.

1,026,378.  Specification of Letters Patent.  Patented May 14, 1912.

Application filed December 20, 1910. Serial No. 598,365.

*To all whom it may concern:*

Be it known that I, SYLVESTER C. BEARDSLEY, citizen of the United States, residing at Kirksville, in the county of Adair and State of Missouri, have invented certain new and useful Improvements in Cow-Tail Holders, of which the following is a specification.

This invention relates to an improved cow tail holder, and refers particularly to a device for clamping the tail to the leg of the animal.

An object of the present invention is to provide a light, simple, and strong device capable of holding the cow's tail while milking, and a device which can be adjusted by one hand.

The device is provided with spring operating jaws clamping against the sides of the leg of the animal so as not to bind entirely about the same, and which is provided with a spring clamping arm to hold the end of the tail within the outer end of the clamp.

Another object of the invention is to provide a device of this character wherein the leg of the animal at the point where the device is applied is protected from abrasion, and the tail firmly held without injury thereto.

For a full understanding of the invention and the merits thereof and also to acquire a knowledge of the details of construction, reference is to be had to the following description and accompanying drawings, in which:

Figure 1 is a perspective view of the improved holder as applied to an animal; Fig. 2 is a top plan view of the holder enlarged; Fig. 3 is a similar view disclosing the same partially in section; and, Fig. 4 is an outer end view of the holder.

Corresponding and like parts are referred to in the following description and indicated in all the views of the drawing by the same reference characters.

Referring to the drawing the numerals 10 and 11 designate a pair of spaced levers formed midway of their ends with inwardly and oppositely extending ears 12 arranged in overlapping relation. A pivot pin 13 passes through the overlapping ends of the ears 12 to hingedly connect the levers 10 and 11. The inner ends of the levers 10 and 11 are formed with inturned and registering jaws 14. The meeting extremities of the jaws 14 are enlarged and rounded to provide relatively flat bearing surfaces for engagement against the leg of an animal. It will be noted from Figs. 2 and 3 that considerable space is provided between the extremities of the jaws 14 and the overlapping ears 12. This space is provided for the portion of the animal's leg which is included between the jaws.

The outer ends of the levers 10 and 11 are diverged to provide hand-engaging portions adapted to be contracted when opening the jaws 14. Flanges 15 project inwardly from the opposite edges of the levers 10 and 11 at their outer ends to provide elongated channels in the inner faces of the levers.

A spiral spring 16 having its outer helices disposed in the same horizontal plane and its inner helix engaging closely around the pin 13 is supported between the ears 12. The outer helix of the spring is extended normally into the channel 15 formed in the lever 10 as shown at 17, the outer extremity of the end 17 projecting beyond the outer end of the lever 10 and formed into a loop 18 for engagement by the thumb of the operator. The inner helix of the spring 16 is extended at 20 and engages in the channel of the lever 11 as shown in Figs. 3 and 4. By this arrangement the spring is firmly supported and prevented from movement relative to the pin 13 while at the same time operating effectually to produce the requisite grip between the jaws 14 and to also hold the tail of the animal between the arm 17 and the lever 10. The lever 10 is provided with stops 19 which project inwardly from the edges of the flanges 15 in registration with one another to receive thereagainst the portion of the cow's tail which is to be secured in the holder, the stops 19 thus coacting with the yieldable arm 17 to firmly hold the tail without injury thereto or annoyance to the animal. From the position of the spring 16 it is readily seen that it serves the twofold purpose of a means for holding the handle portions apart and normally closing the jaws 14 and also as an effectual clamp in conjunction with the stops 19 for holding the tail of the animal. With this peculiar form of spring 16, in which the outer helices thereof lie in substantially the same plane, and as the inner helix closely engages the pivot pin the holder is capable of being formed relatively flat so as to occupy but small space and at the same time to possess the strength and the gripping action required of the same.

In applying the holder the handle portions are compressed to separate the jaws 14 when the holder is forced over the rear edge or tendon of the leg of the animal in registration with the lower end of the tail. As soon as the handle portions are released the spring 16 closes the jaws 14. The operator now grasps the end of the animal's tail in one hand and presses the loop 18 with the thumb of the opposite hand to move the end of the spring 17 out of the channel. The operator now inserts the tail between the end of the spring 17 and the lever 10 when he releases the lever 17 and allows the same to bind against the tail. As will be observed from Fig. 1 the end of the tail is positioned against the inner edge of the lever 10 against the stop 19, and the tail is held in such position by the action of the end 17. It will also be noted that the larger outer helix of the spring projects for a considerable distance into the space between the ears 12 and the gripping jaws 14, and thus protects the portion of the animal which is inclosed by the jaws from abrasion by the relatively thin sharp edges of the ears.

Having thus described the invention, what is claimed is:

1. A cow tail holder comprising a pair of levers having registering gripping jaws upon one end and spaced handle portions at their opposite ends, one of said handle portions having inwardly directed stops spaced apart, a pin hingedly connecting the levers intermediate their ends, and a spring coiled around the pin between the levers and having its ends extended and bearing against the inner opposite faces of the handle portions with one of said extended spring ends therein between said stops and projecting in advance of the same.

2. A cow tail holder comprising a pair of levers having registering gripping jaws upon one end and spaced handle portions at their opposite ends and with inwardly directed perforated ears intermediate the ends of the levers, a pivot pin extending through said ears, stops extending inwardly from one of said handle portions, a spiral spring formed with relatively large outer helices and a relatively small inner helix closely engaging around the pin, one end of the spring being extended from its smaller inner helix and engaging with one of the handle portions and the other end of the spring extended from its larger outer helix and engaging the other handle portion and between the stops.

3. A cow tail holder comprising a pair of levers having registering gripping jaws upon one end and spaced handle portions at their opposite ends and with inwardly directed perforated ears intermediate the ends, a pivot pin extending through said ears, a spiral spring formed with relatively large outer helices and projecting into the space between the gripping jaws and the ears and a relatively small inner helix closely engaging around the pin, one end of the spring being extended from its smaller inner helix and engaging with one of the handle portions and the other end of the spring extended from its larger outer helix and engaging the other handle portion.

In testimony whereof, I affix my signature in presence of two witnesses.

SYLVESTER C. BEARDSLEY. [L. S.]

Witnesses:
C. S. BEARDSLEY,
D. F. BOYD.

---

Copies of this patent may be obtained for five cents each, by addressing the "Commissioner of Patents, Washington, D. C."